ial No. 311,118

UNITED STATES PATENT OFFICE 2,362,290

LUBRICANT

Pharis Miller, Elizabeth, N. J., and Eugene Lieber, Staten Island, N. Y., assignors to Standard Oil Development Company, a corporation of Delaware No Drawing. Application December 27, 1939, Serial No. 311,118

21 Claims. (Cl. 252—48)

This invention relates to a novel type of metal compound and methods of preparing same, and relates more particularly to the use of these novel compounds as addition agents in hydrocarbon compositions, especially lubricating oils, for improving same.

It has been found that hydrocarbon compositions, especially hydrocarbon lubricating oils, are greatly improved by adding thereto a small amount of metal compound such as an aluminum salt of tertiary amyl phenol thio-ether, which might also be called a sulfide of an aluminum tertiary amyl phenolate. It is believed to have the formula, shown in its simplest form as:

which may be written out more in detail as follows:

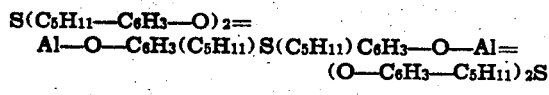

If the various groups attached to the aromatic nucleus are so positioned that the amyl group is in an ortho position to the oxygen and the sulfur linkage is in a meta position to the oxygen, this compound, although it might have other possibilities, probably has the following graphic formula:

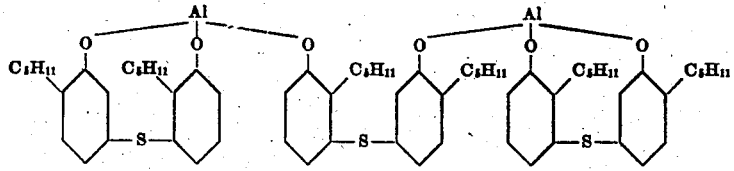

It should be understood that the position of the various substituents around the aromatic nucleus may be varied without departing from the scope of the invention.

A similar disulfide compound may be used in which the group —S— in the above graphic formula is replaced by the group

or if preferred by the group —S—S—, or even higher polysulfides may be used.

These various compounds can be produced by preparing the corresponding alkyl phenol sulfides or disulfides, which per se are known, and converting these into the corresponding sodium or potassium salts thereof, as by treatment with sodium or potassium hydroxide and then converting the resultant derivative of the group I metal into the corresponding derivative of the group III metal, such as aluminum, by suitable means such as by double decomposition of a suitable corresponding aluminum compound such as the chloride, nitrate, etc. If desired, the alkyl phenol sulfide may be converted directly into the corresponding aluminum salt by fusion with a mixture of aluminum chloride and sodium hydroxide, or by other means.

The invention may be described more broadly as comprising a substituted phenolate compound of a light metal having an odd valency and preferably a molecular weight below about 40, containing at least one grouping having the general formula:

wherein M represents the metal constituent connected through Y to at least one aromatic nucleus, Y is an element in the right hand side of group 6 of the periodic table (Mendeleeff), Ar is an aromatic nucleus, which contains like or unlike substituents, X, $n$ in number, replacing nuclear hydrogen, $n$ being at least one.

The substituents, X, may be organic, inorganic, or both, for example, alkyl radicals and groups containing one or more of the non-metallic elements belonging to groups V, VI, and VII of the periodic system (Mendeleeff): nitrogen, phosphorus, oxygen, sulfur, and halogens, as in amino, nitro, phosphite, phosphate, hydroxy, alkoxy, sulfide, thioether, mercapto, chloro groups, and the like.

In the phenolate salts constituting blending agents featured by this invention, valences of the metal other than those connected to the substituted phenolic radicals, such as ·O·Ar(X)$n$, are connected through oxygen to other organic groups or to inorganic constituents, such as hydrogen, phosphorus, etc. For convenience, non-phenolic radicals or groups, as well as phenolic groups, attached to the metal are indicated broadly by —O·R in the following types of compositional formulae, which broadly represent metal derivatives of substituted phenolic compounds containing the characteristic compositional grouping described:

M—O·Ar(X)ₙ

M—O—(X)ₙAr—Xₙ—Ar(X)ₙ—O—M

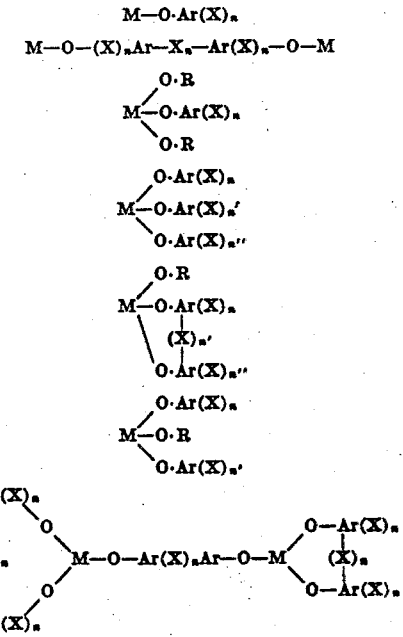

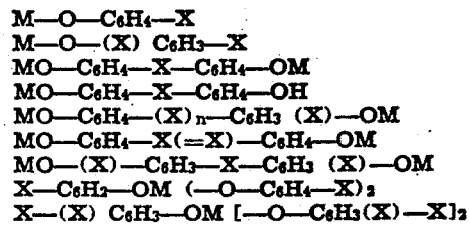

Specifically illustrating some of the structures which the substituted phenolates may have, aromatic nuclei are indicated in the conventional manner by being represented by benzene nuclei of compositions ·C₆H₄·, ·C₆H₃·, etc., with X, as before, standing for nuclear substituents (e. g., —CₙH₂ₙ₊₁, —NO₂, —Cl, —S—, —S₂—, —NH₂, —NH(CₙH₂ₙ₊₁), etc.):

M—O—C₆H₄—X
M—O—(X) C₆H₃—X
MO—C₆H₄—X—C₆H₄—OM
MO—C₆H₄—X—C₆H₄—OH
MO—C₆H₄—(X)ₙ—C₆H₃ (X)—OM
MO—C₆H₄—X(=X)—C₆H₄—OM
MO—(X)—C₆H₃—X—C₆H₃ (X)—OM
X—C₆H₂—OM (—O—C₆H₄—X)₂
X—(X) C₆H₃—OM [—O—C₆H₃(X)—X]₂

Corresponding metal derivatives of the following types of substituted phenolic compounds can be used, in which R represents an alkyl group, preferably having at least 4 carbon atoms:

HO—(R)C₆H₃—S—C₆H₃(R)—OH
HO—(R)C₆H₃—S—S—C₆H₃(R)—OH
HO—(R)C₆H₃—S(=S)—C₆H₃(R)—OH

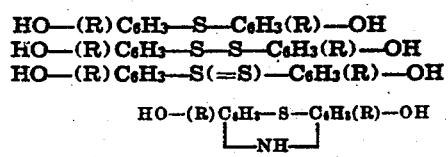

HO—(R)C₆H₃—S—C₄H₉
  (may be branched or straight chain)
HO—(R)C₆H₃—S—CH₂—C₆H₅
HO—(R)C₆H₃—S—CH₂—C₆H₃(R)OH
HO—(R)C₆H₃—S—CₙH₂ₙ—OH
HO—(R)C₆H₃—S—C₆H₃(R)—(CₙH₂ₙ)—OH
HO—(OR)—C₆H₃—S—C₆H₂(R')(OR)—OH
HO—(R)(NH₂)C₆H₂—S—C₆H₂(NH₂)(R)—OH
HO—(R)(OH)C₆H₂—S—C₆H₂(OH)(R)—OH
HS—(R)C₆H₃—S—C₆H₃(R)—OH

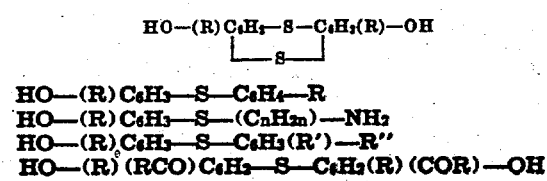

HO—(R)C₆H₃—S—C₆H₄—R
HO—(R)C₆H₃—S—(CₙH₂ₙ)—NH₂
HO—(R)C₆H₃—S—C₆H₃(R')—R''
HO—(R)(RCO)C₆H₂—S—C₆H₂(R)(COR)—OH

It is preferred that if the substituted metal phenolates contain an inorganic substituent attached to the aromatic nucleus, or an organic group linked through an inorganic element, it should preferably be sulfur, as in the case of the alkyl phenolate thioethers or polysulfides. However, although not as good, corresponding metal derivatives of the following substituted phenolic compounds may be used, in which an inorganic substituent other than sulfur is used:

HO—(R)C₆H₃—O—C₆H₃(R)—OH
[HO—(R)C₆H₃—]₃P
HO—(R)C₆H₃—O—CH₂—C₆H₄—OH
HO—(R)C₆H₃—CH₂—O—C₆H₃(R')—OH
HO—(R)C₆H₃—P(OH)—C₆H₃(R)—OH
HO—(R)C₆H₃—CH₂NH—C₆H₃(R)—OH
HO—(R)C₆H₃—CH(Cl)—CH₂—C₆H₃(R)—OH

Especially preferred are compounds containing at least one grouping having the general formula:

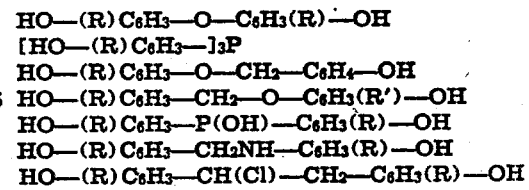

where M is the metal, Ar is an aromatic nucleus, R is an organic group, Z is a member of the sulfur family, and n is an integer of 1 to 5, Z is preferably sulfur, and n is preferably 1 or 2, although for some specific purposes it may be 3 or more. R represents an organic group which may be either aryl, alkyl, aralkyl or cycloalkyl, and which may contain substituent groups such as halogen, particularly chlorine, nitro, nitroso, amino, hydroxy, carboxy, alkoxy, aroxy, mercapto, and the like, but preferably is or contains an alkyl or alkylenyl group, and preferably contains at least 4 carbon atoms but may contain many more, such as 8, 10, 16, 18, etc.

The configurations of the compounds are not limited to certain positions in the illustrated structures, for the substituents may be in ortho, para, or meta relations to one another. Also, the substituents, X, in any aromatic nucleus may be alike or different.

The aromatic nucleus may be polycyclic as in naphthalene, phenanthrene, diphenyl, etc. Where oxygen occurs, it may be replaced by sulfur, selenium, or tellurium, as in thiophenols.

An important feature of this invention issues from the observation that metal phenolates are benefited in solubility and effectiveness as hydrocarbon lubricating oil blending agents when they contain a total of at least 8 and preferably of at least 10 carbon atoms per molecule in aliphatic grouping when sulfur is present in the molecule, and preferably at least 16 carbon atoms if no sulfur is present, preferably in alkyl radicals present as aromatic nuclear substituents. Another valuable feature is that inorganic substituents, particularly negative inorganic groups containing non-metallic elements of groups V, VI, and VII of the Mendeleeff Periodic System, beneficially influence the phenolates by increasing their potency for stabilizing the lubricating oils and by making the phenolates, in themselves, more stable, as for instance, against hydrolysis.

Specific examples of preferred substituted phenolates falling into the classes mentioned, having a mono- or tri-valent constituent, e. g., sodium, potassium, aluminum, etc., and having an alkyl radical as a substituent are formulated as follows:

I. Alkyl phenolates $$M \cdot O \cdot C_6H_4 \cdot C_nH_{2n+1}$$
$$M \cdot O \cdot C_6H_3(C_nH_{2n+1})_2$$
$$M(\cdot O \cdot C_6H_4 \cdot C_nH_{2n+1})_3$$

e. g., salts of tert-amyl phenol
salts of tert-octyl phenol

II. Alkyl chlorphenolates $$M \cdot O \cdot C_6H_3Cl \cdot C_nH_{2n+1}$$

e. g., salts of 2 chloro, 4 tert-amyl phenol
salts of 2, 6 dichloro, 4 tert-amyl phenol
salts of 6 chloro, 2,4 diamyl phenol III. Alkyl amino phenolates $$M \cdot O \cdot C_6H_3(NH_2)(C_nH_{2n+1})$$
$$M \cdot O \cdot C_6H_4 \cdot NH \cdot C_nH_{2n+1}$$

e. g., salts of amyl, para-amino phenol
salts of N-amyl, para-amino phenol

IV. Thioethers of alkyl phenolates $$(M \cdot O \cdot C_6H_3C_nH_{2n+1})_2S$$
$$M_2[(O \cdot C_6H_3 \cdot C_nH_{2n+1})_2S]_3$$

e. g., thioether of salts of tert-amyl phenol

V. Disulfides of alkyl phenolates $$(M \cdot O \cdot C_6H_3 \cdot C_nH_{2n+1})_2S_2$$

e. g., salts of tert-amyl phenol disulfide

VI. Alkyl nitrophenolates $$M \cdot O \cdot C_6H_3(NO_2)(C_nH_{2n+1})$$

e. g., salts of alkyl nitro phenol sulfide

As these substituted phenolates are generaly made by reacting the corresponding phenols with a metal oxide or hydroxide (either the one desired, or the sodium or potassium compounds to be converted into the one desired), the amount of metal in the phenolate product will depend on proportions of reactants used, and since products having different proportions are possible the product will usually consist of a mixture, which may be used as such or be separated into its several constituents. If only part of the sodium or potassium is converted into the corresponding aluminum derivative, the resultant product will contain molecules having both aluminum and sodium or potassium.

As seen from the above description, the metal compound preferably has the general formula:

$$[(R—AR—O)_2S_x]_nM_2$$

where M is a metal having a valency of 1 or 3, $x$ is 1 or 2, and $n$ is the valency of such metal, and more particularly still, the following general formula:

$$[(R—C_6H_3—O)_2S]_3Al_2$$

In these latter two formulas R represents one or more alkyl groups having enough carbon atoms, preferably at least 10, to insure solubility of the total compounds in mineral oil. Instead of aluminum, gallium or other metals of group III of the periodic table may be used, although aluminum is preferred.

For the objects stated, the metal phenolates have been preferably prepared from phenolic compounds readily obtainable by synthetic alkylation of the simple phenols or by extraction from high boiling petroleum oils.

Suitable synthetic alkyl phenols for preparing the desired phenolates are principally of the secondary and tertiary types, because alkylation of a simple phenol occurs more readily with branched aliphatic reactants. Commonly, the alkylation reaction involves a condensation of olefins with the simple phenols, the reaction being catalyzed by anhydrous metal halides, sulfuric acid, phosphoric acid, or certain activated clays. As olefinic reactants, refinery gases containing propylene, butylenes, amylenes, etc., are economically useful, although individual olefins, e. g. isobutylene, iso-amylene, di-isobutylene, tri-isobutylene, etc., or olefin-containing mixtures from other sources may be used. The reaction temperature is usually controlled to avoid side reactions. In employing sulfuric acid, a liquid phase reaction at relatively low temperatures is preferred; with phosphoric acid the reaction may be carried out in the vapor phase.

As starting materials for conversion into the metal phenolates, the phenols may contain one or more substituents which provide a desired number of saturated carbon atoms in groups having the form of straight chains, branched chains, or even rings. Mono-alkyl or poly-alkyl phenols are synthesized conveniently by alkylating a phenol with a branched chain olefin polymer, such as diisobutylene, di-tert-amylene, or other suitable agents, such as alcohols, alkyl sulfates, alkyl phosphates, or alkyl halides, thereby forming a carbon-to-carbon bond between the aromatic nuclei and the alkyl groups.

Petroleum phenols which qualify for the present purpose are considered to contain polymethylene or cycloalkyl side chains, as evidenced by their hydrogen and carbon analysis. The petroleum phenols are obtained by extraction of various stocks, chiefly from cracking process heating oil stocks, with caustic soda, and acidification of the alkaline extract with a weak mineral acid followed by a non-destructive distillation, if desired.

By using the described methods or any other well known method for preparing alkyl phenols, the following alkylated phenols, i. e., may be procured for preparing the phenolates: tert-amyl phenol, iso-hexyl phenol, tert-octyl phenol, di-tert-butyl phenol, etc.

Inorganic substituents are introduced into alkyl phenols by well known methods. For example, an alkyl phenol, e. g. tert-amyl phenol, is reacted with sulfur mono-chloride, $S_2Cl_2$, in about a 1:½ mole ratio and preferably in a solvent such as dichlorethane, to produce the alkyl phenol disulfide. Using substantially the same procedure but substituting sulfur dichloride, $SCl_2$, for the mono-chloride, the alkyl phenols are given a thioether linkage substituent. Alkyl chlorphenols are obtained by chlorination, preferably controlled to replace nuclear hydrogen by a chloro group. This may be accomplished by chlorinating the phenol before alkylation. In such a manner, for example, 2-chlor-4-tert-amyl phenol can be produced. Nitro substituents are introduced readily into the aromatic nucleus by direct nitration, and nitro substituents can be reduced to amino groups. It is to be understood, however, that the preparation of substituted phenolic compounds which have been described does not form part of this invention and that any of the well known methods for their production may be used.

The invention will be better understood from a consideration of the following experimental data:

EXAMPLE 1

39 parts by weight (1/10 mole) of tertiary amyl phenol thioether (made according to U. S. Patent 2,139,321) were dissolved in alcohol, and 5 parts by weight of an alcoholic solution of potassium hydroxide were slowly added with stirring, and the resulting alcoholic solution was evaporated to dryness on a steam bath. The residue was the potassium salt of tertiary amyl phenol thioether, which might otherwise be called the thioether of tertiary amyl potassium phenolate. (A slight excess of the phenol thioether was used to insure the absence of free alkali.)

The product was soluble in mineral oil. An 0.2% blend of this product was made in a commercial paraffinic type lubricating oil having the following inspection:

| | | |
|---|---|---|
| Gravity | °A. P. I. | 29.2 |
| Flash point | °F. | 445 |
| Viscosity Saybolt at 100° F. | | 385 |
| Viscosity Saybolt at 210° F. | | 56 |
| Pour point | °F. | −20 |
| Color, Robinson | | 8½ |
| Conradson carbon residue | percent | 0.107 |

The original oil and the blend were subjected to several tests to determine their comparative tendencies to form sludge under various conditions.

| | Test | |
|---|---|---|
| | Cone | Sligh |
| Original | 0.45 | 24 |
| Blend | 0.28 | 15 |

These tests show that the blend was superior to the original oil in both tests.

Cone test

This is a test to determine the suitability of a lubricating oil for use in internal combustion engines, and consists essentially in passing a small stream of the oil to be tested down an open spiral groove cut in the inner surface of a metal cone. The cone is maintained at 250° F. and the weight of carbonaceous deposit left by the oil is determined. Lower values indicate the best oil. The detailed procedure recommended for carrying out this test is described in Patent 2,174,021.

Sligh test

This is a test of the tendency of an oil to sludge under oxidizing conditions and is described in the proceedings of the A. S. T. M. vol. 24, page 964, part II (1924), except that the oxidation is carried out for a period of twenty-four hours. The result is expressed as the weight of sludge produced, and accordingly the lowest values indicate the best oil from this particular point of view.

A 2% blend of the same potassium salts described above in the same commercial lubricating oil base stock was tested on the Mougey machine to determine its lubricity or load-carrying capacity and was found to carry 24 weights which is a fairly high value, and indicates that the potassium salts of the tertiary amyl phenol thioether possess value as an oiliness agent whereas the corresponding tertiary amyl phenol thioether itself has no load carrying capacity.

EXAMPLE 2

20 parts by weight of the potassium salts of tertiary amyl phenol thioether, prepared as described above in Example 1, were disolved in absolute alcohol and 10.8 parts by weight of aluminum nitrate, $Al(NO_3)_3 \cdot 9H_2O$, dissolved in absolute alcohol were slowly added to it. The mixture was evaporated to dryness and the residue was extracted with ether, filtered and evaporated to dryness. The final residue was an aluminum salt of tertiary amyl phenol thioether and it was soluble in oil. A 0.2% blend (in the same commercial lubricating oil described in Example 1) caused no darkening of the color and gave a cone test of 0.20 as compared to 0.45 for the orignal oil.

EXAMPLE 3

200 parts by weight (.51 mole) of tertiary amyl phenol thioether dissolved in absolute alcohol, were treated with 57.4 parts by weight (1.0 mole) of filtered alcoholic potassium hydroxide and the mixed solution was evaporated to dryness on a steam bath. The product, although not as soluble in mineral lubricating oil as the potassium salts prepared in Example 1 by the use of a slight excess of the tertiary amyl phenol thioether, was converted to the corresponding aluminum salt by adding an alcoholic solution of partially dried aluminum nitrate to an alcoholic solution of the potassium salt, using an excess of the aluminum nitrate. The mixed solution was extracted with ether and evaporated to dryness.

EXAMPLE 4

173 parts by weight of tertiary amyl phenol thioether, 17.3 parts by weight of finely powdered sodium hydroxide, and 40 parts by weight of anhydrous aluminum chloride, were placed in a 3-necked flask. The latter was heated to 150° C. with stirring, and the bath was heated at 130–150° C. over night with continuous stirring. The residue was dissolved in ether and the ether solution was evaporated to dryness. The product was soluble in mineral oil and contained a substantial proportion of aluminum salt of tertiary amyl phenol thioether, although it apparently was not quite as pure as the aluminum salt prepared in Example 2. An 0.2% blend of the product in the same commercial lubricating oil used in Example 1 gave a cone test of 0.29 compared to 0.45 for the original oil.

EXAMPLE 5

The potassium salt of tertiary amyl phenol thioether was prepared by neutralizing alcoholic solutions of potassium hydroxide and tertiary amyl phenol thioether as described above. Aluminum ethylate was prepared by adding aluminum chloride to anhydrous ethyl alcohol. The two alcohol solutions were mixed and then were allowed to stand on a water bath, filtered free of the slight precipitate and evaporated to dryness. The product was the aluminum salt of tertiary amyl phenol thioether, and was soluble in hydrocarbon oil. The product had the following chemical analysis, the theoretical value based upon the formula $[(C_5H_{11} \cdot C_6H_3 \cdot O)_2S]_3Al_2$ being also given for the sake of comparison:

| | Actual | Theoretical |
|---|---|---|
| Percent sulfur | 8.04 | 8.55 |
| Percent $Al^2O^3$ | 8.55 | 9.0 |
| Percent Al | 4.52 | 4.8 |

EXAMPLE 6

The sodium salt of tertiary amyl phenol thioether was prepared in the same manner as used for potassium salt as described in Example 1 and the resulting sodium salt was treated with an absolute alcohol solution of aluminum chloride. The aluminum salt of tertiary amyl phenol thioether was produced and was found to be soluble in a Diesel oil having a viscosity of 55 seconds Saybolt at 210° F. The sodium salt used in the preparation of this aluminum compound, had been prepared from a highly purified distilled tertiary amyl phenol thioether.

This procedure was repeated using a plant grade or relatively crude tertiary amyl phenol thioether as the starting material but the resulting aluminum salt of tertiary amyl phenol thioether was likewise found to be soluble in the same Diesel oil.

EXAMPLE 7

217 parts by weight of tertiary butyl phenol thioether were dissolved in anhydrous ethyl alcohol by warming over a steam bath, under substantially anhydrous conditions. 38 parts by weight (an equivalent molecular amount) of potassium hydroxide were dissolved in absolute alcohol. The two solutions were mixed and the resulting product, which was the potassium salt of tertiary butyl phenol thioether, was not as soluble in hydrocarbon oil as was the corresponding amyl compound prepared in Example 1.

EXAMPLE 8

39 parts by weight (.1 mole) of tertiary amyl phenol disulfide were dissolved in alcohol and 16 parts by weight of caustic soda, also dissolved in alcohol, were added and the whole solution evaporated to dryness. The residue is the sodium salt of tertiary amyl phenol disulfide.

This sodium salt was dissolved in alcohol and mixed with an alcohol solution of aluminum nitrate. The precipitate which forms is the aluminum salt of tertiary amyl phenol disulfide and it is filtered out, washed twice with water, and dried.

Corresponding aluminum, etc. salts or other alkyl phenol sulfides may be prepared; for instance, by substituting polysulfides or polymers such as the dimers, trimers, and tetramers, of the alkyl phenol thioethers, disulfides, and the like, in place of the alkyl phenol thioethers used in the above examples. Also, the corresponding metal salts of the corresponding selenides and tellurides may be prepared, although the sulfur compounds are preferred.

The various products obtained may be purified, if desired, by fractional crystallization, extraction, precipitation with selective solvents, etc. Also, impurities may be removed by treatment with suitable adsorptive agents such as clay.

While these compounds or mixtures thereof, alone or in admixture with corresponding alkyl phenol sulfides, may be added in any desired concentration within their solubility limits to lubricating oils, they are preferably used in concentrations of about 0.01 to 2.0%, about 0.1 to 1.0% being generally sufficient to impart oxidation- and sludging-resistant properties to the majority of lubricating oils. Larger amounts up to 5% or more may be used to improve the lubricating or oiliness characteristics of the lubricating oils.

These metal compounds may also be used as improving agents in other hydrocarbon oils or products, such as waxes, fuel oils, Diesel fuels, naphthas, gasoline, burning oil, and the like.

These metal compounds may also be used as improving agents in products derived from petroleum oils or in different types of products such as fatty oils, soaps, aldehydes, resins, rubber, paper, and various synthetic products which tend to deteriorate by oxidation either alone or in accompaniment with other chemical phenomena.

The metal compounds of this invention are especially useful for improving mineral lubricating oils, particularly those used for crankcase lubrication of internal combustion engines, and other oils which are used at elevated temperatures such as above 150° or 200° C. These oils may be obtained from various types of crudes such as paraffinic, naphthenic, asphaltic, or mixed crudes such as paraffinic, naphthenic, asphaltic, or mixed crudes, and they may be either plain distillates or fractions obtained by treating or refining in various methods known to the art such as acid treating, clay treating, solvent extraction, dewaxing, etc., or they may be synthetic oils resulting from various types of chemical reactions such as cracking, polymerization, condensation, and the like.

In preparing finished lubricants according to this invention, other known addition agents may also be used such as dyes, soaps, pour inhibitors, sludge dispersers, oxidation inhibitors, mutual solvents, etc.

Although the invention is of primary importance for preparing Diesel engine lubricants, it is also useful for other types of crankcase lubricants, steam cylinder oils, greases, upper cylinder lubricants, slushing oils, etc.

The invention has numerous advantages, some of which are apparent from the preceding discussion, but it should also be pointed out that the invention provides unexpectedly useful results in making aluminum available in oil-soluble form; this is surprising because aluminum soaps seem to be substantially less soluble in mineral oils than soaps of other metals such as the heavy metals. At the same time, the metal compounds of this invention possess the distinctly unexpected advantage that they have very substantial anti-oxidant properties. On the other hand, aluminum stearate of the prior art is not oil-soluble and usually forms gels in the lubricating oil, particularly when cooled down from high temperature and also upon long standing, and yet soluble metal compounds such as lead naphthenate usually greatly increase the oxidation rate of the oils to which they are added. The aluminum compounds of this invention also possess unexpectedly good dispersion properties and therefore have advantages as a sludge dispersing agent. There is also evidence to indicate that they act to some extent as anti-polymerizing agents, especially in oils used at relatively high temperature such as Diesel engine lubricants.

These and other advantages of the invention will be still better understood from an examination of the following engine test data:

EXAMPLE 9

1.5% of aluminum salt of tertiary amyl phenol thioether was dissolved in a Diesel lubricating oil base stock having the following characteristics:

Viscosity, Saybolt at 210° F. (secs.) _____ 62.2
Viscosity index _____ 36
Flash point _____°F__ 410
Conradson carbon residue _____ per cent__ 0.11
Neutralization No _____ 0.04

The oil was obtained from a Coastal crude.

Both the original oil and the blend were subjected to a test in the C. F. R. (Cooperative Fuel Research) engine for 14 hours at 375° F. jacket temperature, using 2½ lbs. of oil in the charge. After each run, the engine is taken down, inspected, and rated by demerits (the lower the better) according to the condition of the piston parts, valves and cylinders. The demerit rating of the blank oil is represented as 100 and the reference rating of the blend is expressed as "percent of reference" and is calculated as follows:

$$\text{Percent of reference} = \frac{\text{blend demerit} \times 100}{\text{blank oil demerit}}$$

The lower the "percent of reference," the better the oil according to this engine test.

The results of these engine tests are tabulated as follows:

| Name or type of test | Original oil | Blend containing 1.5% of aluminum salt of tertiary amyl phenol thioether |
|---|---|---|
| Demerit: | | |
| Piston overall | 1.33 | 0.76 |
| Varnish | 3 | 0 |
| Carbon underside | 3 | 1 |
| Rings stuck | 0 | 0 |
| Carbon, grams | 1.82 | 0.91 |
| S. D. sligh | 34.9 | 14.4 |
| Oxidation rate | 13, 14, 15, 14 | 47, 36, 41, 34 |

These results indicate that although the aluminum salt of tertiary amyl phenyl thioether slightly accelerated the oxidation rate of this particular lube oil base stock, it caused a remarkable improvement in the general condition of the engine at the end of the test by reason of the lower demerits, lower amount of carbon formed, and lower S. D. Sligh (sludge) figure.

The oxidation test, referred to above, comprises oxidizing the oil under certain specified conditions and determining the amount of oxygen (measured in cubic centimeters) absorbed in successive 15 minute intervals.

EXAMPLE 10

0.5% of an aluminum salt of tertiary amyl phenol thioether was dissolved in a Diesel lubricating oil base stock, made from a Coastal crude, having the following inspection:

| | |
|---|---|
| Gravity | 22.0 |
| Flash °F | 395 |
| Fire °F | 450 |
| Viscosity Saybolt at 100° F | 519.5 |
| Viscosity Saybolt at 210° F | 54.9 |
| Pour point °F | −15 |
| Viscosity index | 29 |
| Cloud | |
| Color | 15¼ |
| Color hold | 9¼ |
| Conradson carbon | 0.04 |
| Neutralization No | 0.06 |
| Saponification No | 0.11 |

When this blend and the original oil were subjected to a Sligh test to determine sludging tendencies, the results were as follows:

| Oil | Sligh test (mgs. of sludge) |
|---|---|
| Original oil | 61 |
| Original oil+0.5% aluminum compound | 21.9 |

The blend containing the aluminum salt was superior to the original oil.

1.0% of this same aluminum salt was dissolved in the same original oil and the blend was subjected to an oxidation rate test along with the original oil for comparison, the results being as follows:

| Oil | Oxidation rate (ccs. $O_2$/15 min.) |
|---|---|
| Original oil | 43–45–39–41 |
| Original oil+1% aluminum compound | 20–14–14–13 |

These tests show that the aluminum salt of the tertiary amyl phenol thioether both reduces the oxidation rate and sludge formation in this lube oil base stock.

EXAMPLE 11

0.25% of aluminum tertiary amyl phenol thioether was dissolved in another commercial lubricating oil base stock (S. A. E. 20) and both the blend and original oil were subjected to oxidation, Sligh, and C. F. R. engine tests, with the following results, also including results on a similar blend of the corresponding sodium salt of tertiary amyl phenol thioether:

| Oil | Oxidation rate (average of first four 15 min.) | Sligh | C. F. R. engine per cent reference |
|---|---|---|---|
| Original oil | 40 | 1.9 | 100 |
| Original oil+0.25% sodium compd. | 11 | 10.4 | 39 |
| Original oil+0.25% Al | 24 | 2.9 | 24 |

These tests indicate that although the sodium compound effected improvement in the engine performance of the lubricating oil base stock, the aluminum compound is even better because the latter showed a "percent of reference" of only 24. On the other hand, the sodium compound effected the greatest reduction in the oxidation rate and therefore although it was not as good as the aluminum compound in improving engine performance of the lubricating oil base stock, it still has value as an addition agent to other types of hydrocarbon oil for reducing the oxidation rate thereof.

EXAMPLE 12

A 1% solution of aluminum salt of tertiary amyl phenol thioether in a naphthenic lubricating oil base stock having a viscosity of 55 secs. Saybolt at 210° F. was subjected to a carbon black dispersion test which is considered of interest in evaluating sludge dispersers for internal combustion engine lubricants. In this test, 450 grams of the oil to be tested is heated to 225° F. and agitated in a "Mix Master" during the stepwise addition of 30 grams of carbon black. After 30 minutes of further stirring, the suspension is transferred to a graduated 500 cc. cylinder, settled for 22 hours in an oil bath at 200° F., and allowed to stand for an additional 2 hours at room temperature. In the absence of a dispersing agent, the carbon black settles out and leaves a clear supernatant layer of oil, the volume of which is recorded; the smaller this value, the better the dispersing power of the oil. In the presence of an effective disperser, however, the volume of oil settled clear will be zero, or, in other words, the carbon black remains suspended throughout the entire volume of oil in the cylinder and in this case the effectiveness of the disperser is evaluated by determining the concentration of carbon black remaining in the suspension at a given volume from the top of the cylinder. For this purpose, a 10 cc. aliquot of the suspension is pipetted at a point 25 cc. below the surface of the mixture, diluted to an appropriate volume with naphtha, and the concentration of carbon black is determined by turbidimetric comparison with a standard suspension, reporting the results in terms of milligrams of carbon per cc. in suspension.

For comparison with the 1% solution of aluminum t. a. p. s. (tertiary amyl phenol sulfide), a sample of the blank oil was also tested, as well as a solution of 1% of t. a. p. s. therein.

The results of these dispersion tests are summarized as follows:

|  | Cc. settled | MgC/cc. suspended |
|---|---|---|
| Lube oil base stock [1] | 200 | 0 |
| Lube oil base stock+1% t. a. p. s. | 145 | 0 |
| Lube oil base stock+1% Al t. a. p. s. | 0 | 21 |

[1] The naphthenic lube oil having a viscosity of 55 sec. Saybolt at 210° F.

These tests indicate that the aluminum salt of the tertiary amyl phenol sulphide maintain the carbon black suspended throughout the entire volume of the oil (no oil had settled clear), and the amount of carbon black held in suspension near the top of the cylinder was 21 milligrams of carbon per cc., which is a remarkably and unexpectedly high value, since both the blank oil and the blend containing 1% of the tertiary amyl phenol sulphide itself had a large volume of oil settled clear at the top and no carbon remained suspended near the top of the cylinder. These test results are considered to indicate that the aluminum salt of the tertiary amyl phenol sulphide is substantially effective as a sludge disperser in internal combustion engine lubricants.

This invention is not to be limited to any of the specific examples presented herein which were given solely for the purpose of illustration, nor by any theory as to the mechanism of the operation of the invention, but only by the following claims in which it is desired to claim all novelty inherent in the invention as far as the prior art permits.

We claim:

1. A lubricant comprising a major proportion of mineral lubricating oil and a small amount of a compound containing at least one grouping having the general formula $$\overset{OM}{\underset{|}{R-Ar-Z_x-}}$$

where M is a light metal having an odd valency, Ar is an aromatic nucleus, R is an organic group, Z is a member of the sulfur family and $x$ is an integer of 1 to 5.

2. A lubricant comprising a major proportion of mineral lubricating oil and a small amount of a compound having the general formula $$[(R-Ar-O)_2S_x]_nM_2$$

where Ar is an aromatic nucleus, R is an alkyl group, $x$ is an integer of 1 to 5, M is a light metal having an odd valency, and $n$ is an integer corresponding to the valence of M, in which the sulfur atoms are each linked directly to two aryl nuclei and in which the metal atoms are each linked directly to the oxygen atoms.

3. A lubricant comprising a major amount of mineral lubricating oil and a small amount of a group 3 light metal salt of an alkyl phenol sulfide.

4. A lubricant comprising a major proportion of mineral lubricating oil and a small amount of a sulfide of an aluminum alkyl phenolate.

5. A lubricant comprising a major proportion of a mineral lubricating oil and a small amount of a compound having the general formula $$[(R-C_6H_3-O)_2S]_3Al_2$$

where R is an alkyl group having at least four carbon atoms in which the sulfur atoms are each linked directly to the benzene nuclei and in which the aluminum atoms are each linked directly to the oxygen atoms.

6. A lubricant comprising a major proportion of a mineral lubricating oil and a small amount of a compound having the formula $$S(R-C_6H_3-O)_2=Al-O-C_6H_3(R)S(R)C_6H_3-O-Al=(O-C_6H_3-R)_2S$$

wherein R is an alkyl group having at least four carbon atoms and in which the sulfur atoms are each linked directly to two benzene nuclei and in which the aluminum atoms are each directly connected to the oxygen atoms.

7. A lubricant comprising a mineral lubricating oil and a small amount of an aluminum salt of a tertiary amyl phenol thioether.

8. A lubricant comprising a mineral lubricating oil and a small amount of a disulfide of aluminum alkyl phenolate each alkyl radical containing at least four carbon atoms.

9. A Diesel engine crankcase lubricant comprising a major proportion of a mineral lubricating oil having an A. P. I. gravity of about 15° to 35°, a flash point of about 350–500° F., a viscosity of about 500 to 800 seconds Saybolt at 100° F. and about 40 to 75 seconds Saybolt at 210° F., and about 0.1 to 5.0% of an aluminum salt of an alkyl phenol thioether each alkyl radical containing at least four carbon atoms.

10. A lubricant comprising a mineral oil base stock and a small amount of an oil-soluble aluminum salt of the reaction product of a sulfur halide with an alkylated aryl compound having a hydroxy group attached directly to the aryl nucleus.

11. An improved mineral oil composition comprising a mineral oil having admixed therewith a minor proportion of an oil miscible sulfide of an alkyl substituted aryl aluminum oxide in which the oxygen of the aluminum oxide group is directly attached to the aryl nucleus and in which at least two alkyl substituted aryl nuclei are interconnected by at least one atom of sulfur.

12. An improved mineral lubricating oil composition comprising a mineral lubricating oil having admixed therewith a minor proportion of an oil miscible aluminum salt of an alkylated phenol sulfide having the formula $$R(OH)C_6H_3-S_x-C_6H_3(OH)R'$$

in which the groups R, R', OH and $S_x$ are each connected to an aromatic nucleus ($C_6H_3$), R and R' represent alkyl groups ($C_nH_{2n+1}$) and $x$ represents an integer, 1 or 2.

13. A lubricant comprising a mineral lubricating oil and a small amount of an oil-soluble sulfide of a metal alkyl phenolate in which a plurality of phenol groups are attached to a single metal atom, said metal being a light metal having an odd valency.

14. A lubricant composition according to claim 13 in which said metal is a light metal of Group III.

15. A lubricant comprising a mineral lubricating oil and a small amount of an oil-soluble sulfide of an aluminum alkyl phenolate in which a plurality of phenol groups are attached to a single aluminum atom.

16. An improved mineral oil composition comprising a mineral oil having admixed therewith a minor proportion of an oil miscible sulfide of an alkyl substituted aryl sodium oxide in which the oxygen of the sodium oxide group is directly attached to the aryl nucleus and in which at least two alkyl substituted aryl nuclei are interconnected by at least one atom of sulfur.

17. An improved mineral oil composition comprising a mineral oil having admixed therewith a minor proportion of an oil miscible sulfide of an alkyl substituted aryl potassium oxide in which the oxygen of the potassium oxide group is directly attached to the aryl nucleus and in which at least two alkyl substituted aryl nuclei are interconnected by at least one atom of sulfur.

18. A lubricant comprising a major amount of a mineral lubricating oil and a minor amount of a compound having the formula

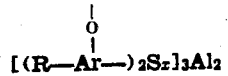

wherein Ar is an aryl nucleus, R is an alkyl group having at least 4 carbon atoms and $x$ is an integer of from 1 to 5.

19. A lubricant comprising a mineral lubricating oil and a small amount of the potassium salt of a tertiary amyl phenol sulfide.

20. A lubricant comprising a mineral lubricating oil and a small amount of the sodium salt of a tertiary amyl phenol sulfide.

21. A lubricating oil composition comprising a major amount of a hydrocarbon lubricating oil and a minor amount of the odd valent light metal salt of an oil-soluble aliphatic substituted phenol sulfide, each aliphatic radical containing at least four aliphatic carbon atoms.

PHARIS MILLER.
EUGENE LIEBER.